United States Patent [19]
Yunoki

[11] Patent Number: 6,078,658
[45] Date of Patent: *Jun. 20, 2000

[54] CALL CONTROL SYSTEM IN AN INTELLIGENT NETWORK

[75] Inventor: Hideo Yunoki, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/975,354

[22] Filed: Nov. 20, 1997

Related U.S. Application Data

[63] Continuation of application No. 08/264,846, Jun. 22, 1994, abandoned, which is a continuation of application No. 07/733,985, Jul. 22, 1991, abandoned.

[30] Foreign Application Priority Data

Jul. 20, 1990 [JP] Japan .................................... 2-190688

[51] Int. Cl.[7] .............................. H04M 7/00; H04M 3/42; H04Q 11/04; H04J 3/12
[52] U.S. Cl. .......................... 379/220; 370/259; 370/260; 370/264; 370/524; 379/202; 379/207; 379/230
[58] Field of Search ..................................... 370/259, 260, 370/261, 262, 263, 264, 389, 522, 524; 379/201, 202, 203, 204, 205, 206, 207, 219, 220, 230, 265

[56] References Cited

U.S. PATENT DOCUMENTS

| | | | |
|---|---|---|---|
| 4,479,195 | 10/1984 | Herr et al. | 379/202 |
| 4,796,293 | 1/1989 | Blinken et al. | 379/202 |
| 5,168,515 | 12/1992 | Gechter et al. | 379/210 |
| 5,379,383 | 1/1995 | Yunoki . | |

OTHER PUBLICATIONS

1988 Autumn National Convention Record, The Institute of Electronics, Information and Communication Engineers, Sep. 6–9, 1988, Funabashi, pp. 1–12.

A Study On Hierarchical Separation Of Call Processing Programs, Eiichi Murayama et al., pp. 13–21.

Network Evolution and the Intelligent Network (IN), Hideo Yunoki, p. 0192, 1990 IEEE.

Advanced Intelligent Network Service Model, Peter A. Russo, pp. 0206–0207, 1990 IEEE.

Intelligent Networking and Services in the Business Communications Environment, Norihiro Aritaka, et al., pp. 149–150, Proceedings of the 1990 International Swithching Symposium.

Telesis Aug. 1978, pp. 303–308, "DMS–10 System Organization" by Rushing and Totti.

*Primary Examiner*—Harry S. Hong
*Attorney, Agent, or Firm*—Staas & Halsey

[57] ABSTRACT

A call control processing system in an intelligent network providing a service to a subscriber terminal of a user when the user requests a service such as a conference call. The call control processing system has an internal primitive unit for managing the physical requirements of the subscriber terminal in response to a number allocated to the call and requests a concept generating and managing unit to execute the service request processing. The concept generating and managing unit generates and manages a concept independent of the physical condition, such as a concept expressing a path between the service switching point and the service control point and a concept for connecting more than two paths and transmitting a message based on the concept through a telephone signal network to the service control point.

6 Claims, 14 Drawing Sheets

DSM : DIGITAL SWITCH MODULE
CSE : COMMON CHANNEL SIGNALLING EQUIPMENT
LC : LINE CONCENTRATOR

| FC-MSG | PARAMETERS | FUNCTIONS |
|---|---|---|
| CREATE-LEG | LEG ID | GENERATION OF LEG |
| GENERATE-CONN | CONNECTOR ID ATTRIBUTE VALUES | GENERATION OF CONNECTOR ACCOMPANYING DESIGNATION OF ATTRIBUTE VALUE SUCH AS MAXIMUM ACCOMMODATED NUMBERS OF LEG |
| ASSOCIATE | LEG ID CONNECTOR ID | CONNECT ONE OR A PLURALITY OF LEGS DESIGNATED TO THE DESIGNATED CONNECTOR. BY THIS ACTION, ALL LEGS CONNECTED TO THE DESIGNATED CONNECTOR ARE PLACED IN TWO-WAY COMMUNICATION MODE. |
| JOIN | LEG ID CONNECTOR ID | GENERATE CONNECTOR AND JOIN GENERATED LEG TO THE GENERATED CONNECTOR. |
| SEPARATE-LEG | LEG ID | SEPARATE LEG FROM CONNECTOR, BUT LEG ITSELF CONTINUES TO EXIST. |
| FREE-LEG | LEG ID | FREE DESIGNATED LEG ON THE ASSUMPTION THAT DESIGNATED LEG HAS ALREADY EXECUTED SEPARATE-LEG BEFORE EXECUTING FREE-LEG. |
| REMOVE-LEG | LEG ID | EXECUTE SEPARATION (SEPARATE-LEG) OF LEG AND FREEING (FREE-LEG) OF LEG. |
| REMOVE-CONN | CONNECTOR ID | EXECUTE REMOVE-LEG ON ALL LEG CONNECTED TO DESIGNATED CONNECTOR AND FREE CONNECTOR ITSELF |
| COUPLE-CONN | MASTER CONN ID SLAVE CONN ID | MERGE TWO DIFFERENT CONNECTORS AND MERGE SLAVE CONNECTOR IS WITH MASTER CONNECTOR. |
| LEG-EXCHG | LEG i LEG j | EXCHANGE STATES OF LEG i AND LEG j. |

FIG. 7

CALL CONTROL SYSTEM IN AN INTELLIGENT NETWORK

CROSS-REFERENCE TO RELATED APPLICATION

This application relates to, and incorporates by reference the subject matter from commonly owned and co-pending U.S. Pat. No. 5,379,383.

This application is a continuation, of application Ser. No. 08/264,846, filed Jun. 22, 1994, now abandoned which is a continuation of application Ser. No. 07/932,985 filed Jul. 22, 1991, now abandoned.

BACKGROUND OF THE INVENTION

The present invention relates to a call control system for an intelligent network (IN).

An intelligent network (IN) for future switch boards has been developed and is now under study by CCITT (Comite Consultatif International des Telegraphique et Telephonique). This intelligent network (IN) provides a switching technology for efficiently executing greatly expanded services in the future.

FIG. 1 shows a system architecture of a conventional intelligent network (IN).

As shown in FIG. 1, a service control device (SCP: Service Control Point) 101 is provided to control a variety of services provided by the intelligent network (IN). The SCP 101 is connected to a telephone signal network 102 to bring services to subscriber terminals, which belong to the telephone signal network 102. The telephone signal network 102 has connected to it a plurality of service switching devices (SSP: Service Switching Point) 103 which execute fundamental switching processing and respective SSPs 103 accommodate therein subscriber terminals 104 (104-1, . . . , 104-n). The SSP 103 only executes the switching operation which is the fundamental function of the switchboard.

With regard to the conventional system of FIG. 1, a call number is used during connection of a call. In other words, the actual assignment of a call number to an incoming call (original call) or to an outgoing call (terminating call) is a conventional technique. For example, in a configuration in which an SSP accommodates subscriber A and B, and in the case that a call between the subscriber A and B is established when subscriber A originates a call and subscriber B terminates the call, two call numbers are created by the SSP, and one call number is assigned to the incoming call from the subscriber A, and the other is assigned to the outgoing call to the subscriber B.

A service key is the information which defines the service application program to be executed in an SCP. The service key is generated in the SSP on receiving a request for providing a communication service from a subscriber terminal.

Next described is a switching method by which a subscriber terminal A accommodated in the SSP 103-1 calls a subscriber B accommodated in the SSP 103-n.

Initially, the SSP 103-1 detects the outgoing call from the subscriber terminal A. Then, the SSP 103-1 asks the SCP 101 what kind of operation it should execute. In response to this inquiry, the SCP 101 asks the SSP 103-1 for information. The SSP 103-1 supplies the SCP 101 with a call number of the subscriber terminal A on the calling side and an incoming call number of the subscriber terminal B on the reception side. The SCP 101 receives this information and issues an instruction to the SSP 103-1 so as to establish the path formed by the subscriber terminal A, the SSP 103-1 and the telephone signal network 102. The SSP 103-1 then establishes this path in response to the instruction.

When the SSP 103-1 transmits to the SCP 101 a signal indicating that the path has been established, the SCP 101 checks the position of the subscriber terminal B and transmits a connection request instruction to the subscriber terminal B to the SSP 103-n. When it receives this instruction, the SSP 103-n checks the "idle" and/or "busy" condition of the subscriber terminal B and transmits the checked condition to the SCP 101. If the subscriber terminal B is not in the communication condition (which means subscriber terminal B is in the idle condition), then the SCP 101 transmits to the SSP 103-n an instruction to establish a path formed by the telephone signal network 102, the SSP 103-n, and the subscriber terminal B. The SSP 103-n receives this instruction, establishes the path and then transmits a path establishment completion signal to the SCP 101. The SCP 101 receives this path establishment completion signal and transmits a communication start instruction to the SSP 103-1. This processing enables communication between the subscriber terminal A and the subscriber terminal B.

If, on the other hand, the line of the subscriber terminal B is occupied, then the SCP 101 transmits information indicating the fact that the subscriber terminal B is in a communication condition (i.e. "busy" condition) to the SSP 103-1 through the telephone signal network 102. Then, the SSP 103-1 transmits this information to the subscriber terminal A and generates a busy signal.

This method, however, has a problem because many exchanges of control information are required between the SSP 103 and the SCP 101.

In an intelligent network, an SSP having a switchboard function is utilized simply as a switching machine and the whole service control is effected by the SCP. This has the advantage that, when the service is added or varied, only the SCP must be varied. However, the exchange of control information needs a lot of time, thus unavoidably increasing the delay time when the service is brought to the subscriber terminal. Even in the most simple processing in which the subscriber terminal A and the subscriber terminal B are connected, as earlier noted in the paragraph on the conventional system, several exchanges of control signals are required between the SCP 101 and the SSP 103. Accordingly, if the service is complicated, then the number of control information exchanges becomes very large. Thus, a complicated service cannot be brought to the subscriber terminal in actual practice.

SUMMARY OF THE INVENTION

It is an object of the present invention to provide an intelligent network (IN) call control system in which the exchange of control information between an SCP and an SSP in an intelligent network can be reduced, thereby reducing a delay time required when a service is brought to a subscriber terminal, and in which a complicated service can be more simply brought to the subscriber terminal.

The present invention is based on an intelligent network (IN) including an IN call control system which has a service control device SCP (service control point) which executes control of a variety of telephone services, a telephone signal network, a switching processing unit which executes the call control processing accompanying the telephone services, a plurality of service switching devices SSP (service switching point) having switching processing units, and subscriber terminals coupled to the switching processing units of respective SSPs.

The SSP contains an internal primitive unit which manages the physical location and condition of the subscriber terminal processed by the switching processing unit in response to the number allocated to the outgoing call and generates an internal processing instruction for controlling the switching processing unit.

The SSP also contains a concept generating and managing unit, which generates and manages a concept independent of the physical condition on the basis of the internal processing instruction generated by the internal primitive unit, transmits a message based on this concept through the telephone signal network to the SCP, and receives the message transmitted by the SCP to manage the concept. As used herein, a "concept" is a unit of information which is implemented in software and stored in hardware. The term "concept" may be interchanged with the term "parameter" to indicate a communication path or a portion of a communication path for a call.

Further, the SCP contains an SSP corresponding concept generating and managing unit which receives the message transmitted from the concept generating and managing unit, generates a concept for establishing a communication path to the receiving side in accordance with the content of the communication service brought by the SCP and manages the concept at every SSP.

The SCP further contains an instruction generating unit which generates a processing instruction corresponding to a communication mode of the communication service brought by the SCP and a message indicating the communication service from the generated concept, and transmits the message through the telephone signal network to the SSP.

In the thus made arrangement of the present invention, the internal primitive unit manages all physical information of the subscriber terminals coupled to the SSP and exchanges control information between it and the concept generating and managing unit using the call number and the service key, thereby concealing the physical information from the concept of generating and managing unit. A call number is uniquely allocated to each call by the SSP. Further, the concept generating and managing unit within the SSP and the SSP corresponding concept generating and managing unit within the SCP generate or manage a concept "LEG" which expresses a path established between the SSP and the SCP and a concept "CONNECTOR", which connects more than two LEG concepts.

Furthermore, the instruction generating unit within the SCP has as an FC-MSG (functional component message) instruction system for processing instructions, at least LEG generation instructions, CONNECTOR generation instructions, ASSOCIATE instructions (instructions to connect a designated LEG to a CONNECTOR to effect a two-way communication state), JOIN instructions (for generating the CONNECTOR and for associating the generated LEG to the CONNECTOR), SEPARATE-LEG instructions (for separating the LEG from the CONNECTOR), FREE-LEG instructions (instruction for freeing the LEG separated from the CONNECTOR), REMOVE-LEG instructions (for separating the designated LEG from the CONNECTOR and for freeing the same), REMOVE-CONNECTOR instructions (for connecting freeing the designated CONNECTOR and all LEGs connected to the CONNECTOR), COUPLE-CONN instruction (for merging two CONNECTORs) and LEG-EXCHG instruction (for exchanging the states of two LEGs). Then, control information of the SCP is expressed by various processing instructions or by a message including concepts made by such instructions. This control information is then transferred to the SSP, and is processed by it.

According to the aforementioned arrangement of the present invention, two concepts, i.e. LEG and CONNECTOR, are introduced into the intelligent network and an instruction system called FC-MSG is formed. This system enables the SCP to manage calls without recognizing a physical location and condition of a subscriber terminal, thus simplifying its control.

Further, since the exchange of information between the SCP and the SSP is executed by way of the message formed of the instruction and the concept, the number of such exchanges can be reduced so that a delay of the control time can be reduced in the service brought by the intelligent network.

Furthermore, by providing a COUPLE-CONN instruction in the FC-MSG instruction system, it becomes possible to simplify the control of conference calls.

To summarize the present invention, when a subscriber terminal of a user requests a service such as a conference call, a call control processing in an intelligent network has an internal primitive unit for managing the physical requirements of the subscriber terminal in response to the number allocated to the call and requests a concept generating and managing unit to execute the service request processing. The concept generating and managing unit generates and manages a concept independent of the physical condition, such as a concept expressing a path between the SSP and the SCP and a concept for connecting more than two paths and transmitting a message based on the concept through a telephone signal network to the SCP. An SSP corresponding concept generating and managing unit within the SCP analyzes the message received from the SSP, generates a concept necessary for the service and manages the concept to be used for every SSP. An instruction generating unit within the SCP utilizes the generated instruction to generate an instruction to realize the service and transmits the same to the SSP. The SSP manages the newly generated concept and sends an instruction to the internal primitive unit. The internal primitive unit converts this instruction into an instruction including physical requirements which can operate a switching processing unit and controls the switching processing unit to form the call. Since the message formed of concepts and a small number of processing instructions is exchanged between the SSP and the SCP as described above, the SCP can manage the call without feeling the physical requirements of the subscriber terminals. Further, since the number of exchanges of control information is reduced, it is possible to reduce a delay of control time in the entire service brought by the intelligent network.

These and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 7 is a table used to explain a functional component message (FC-MSG) used in the embodiment of the present invention;

DETAILED DESCRIPTION OF THE PREFERRED EMBODIMENT

The principle of the present invention will be described first with reference to a block diagram in FIG. 2.

Figure 1:
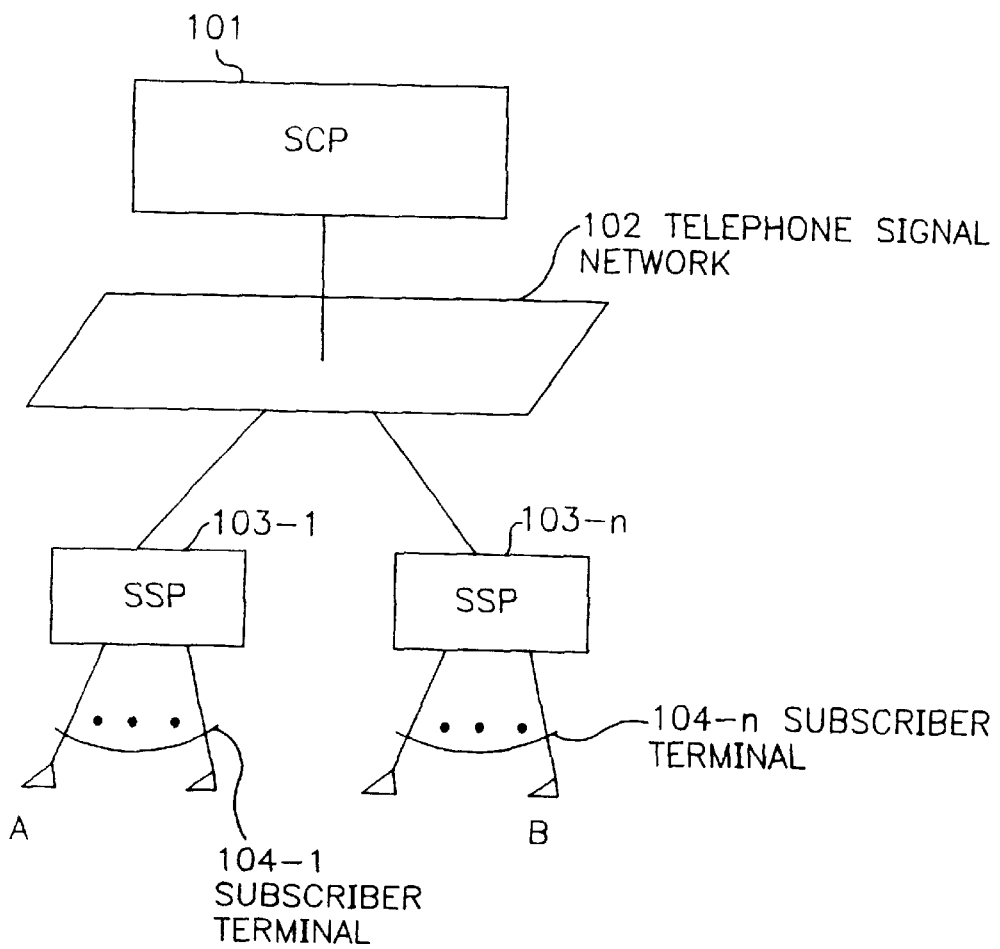
FIG. 1 is a schematic diagram showing a system architecture of an intelligent network.
Figure 2:
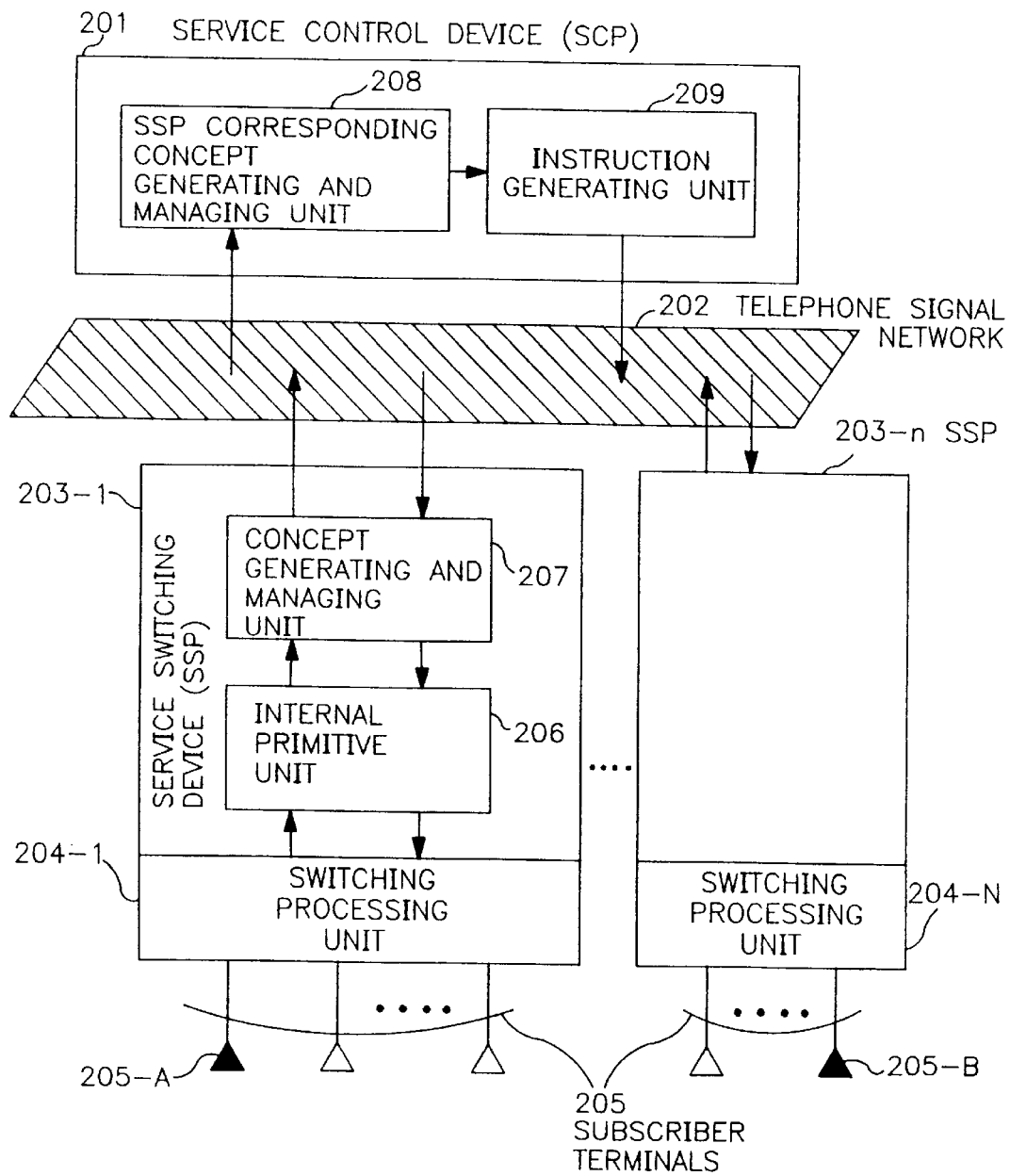
FIG. 2 is a schematic diagram used to explain the principle of the present invention.

As shown in FIG. 2, the present invention is based on a service switching device SSP (Service Switching point) 203 connected to a subscriber terminal 205 and a switching processing unit 204 for executing fundamental switching processing such as switching, and a service control device SCP (Service Control Point) 201 which controls a variety of service processings of the intelligent network (IN). A telephone signal network 202 exists between the SCP 201 and the SSP 203. The telephone signal network 202 has connected to it a plurality of SSPs 203 (203-1, . . . 203-n). The SCP 201 controls services brought to all subscriber terminals accommodated in the SSPs 203.

An internal primitive unit 206 provided within the SSP 203 manages the physical location and condition of a subscriber terminal 205 processed by a switching processing unit 204 in response to the number allocated from the subscriber terminal to the outgoing call and generates an internal processing instruction which is used to control the switching processing unit 204.

A concept generating and managing unit 207, also provided within the SSP 203, is an interface which exchanges a control signal with the SCP 201 via the telephone signal network 202. More specifically, the concept generating and managing unit 207 generates and manages a concept independent of the physical condition on the basis of the internal processing instruction generated by the internal primitive unit 206 and transmits a message based on this concept to the SCP 201 as a control signal. The concept generating and managing unit 207 also receives a message transmitted by the SCP 201 and manages a concept within the transmitted message. The concepts to be generated and managed are a concept "LEG" expressing the path between the SSP 203 and the SCP 201 and a concept "CONNECTOR" which connects more than two concepts "LEG".

An SSP corresponding concept generating and managing unit 208 provided within the SCP 201 receives the message transmitted from the SSP 203, generates concepts (LEG and CONNECTOR) which establish the communication path in accordance with the contents of various communication services brought by the SCP 201, and manages the concept for every SSP 203.

An instruction generating unit 209, provided within the SCP 201, generates a message for executing a communication service from the processing instruction corresponding to the communication mode of the communication service brought by the SCP 201 and the generated concept and transmits the same through the telephone signal network 202 to the appropriate SSP 203. The instructions include, at least a LEG generation instruction, a CONNECTOR generation instruction, an ASSOCIATE instruction used to connect the designated LEG to the CONNECTOR to effect a two-way communication state, a JOIN instruction used to generate a CONNECTOR and to associate the generated LEG to the generated CONNECTOR, a SEPARATE-LEG instruction used to separate the CONNECTOR from the LEG, a FREE-LEG instruction used to free the separated LEG from the CONNECTOR, a REMOVE-LEG instruction used to remove the designated LEG from the CONNECTOR and to free the same, a REMOVE-CONNECTOR instruction used to free the designated CONNECTOR and all LEGs connected to the CONNECTOR, a COUPLE-CONNECTOR instruction used to merge two CONNECTORS and LEG-EXCHG instruction used to exchange the conditions of two LEGs. The message is composed of these instructions and concepts.

Operation of the arrangement based on the above principle of the present invention will be described next.

When a subscriber terminal A (205-A) accommodated within the SSP 203-1 makes an outgoing call to another subscriber terminal B (205-B) accommodated within the SSP 203-n, the switching processing unit 204-1 informs the internal primitive unit 206 that the subscriber terminal A makes the outgoing call. The internal primitive unit 206 receives this information, allocates a call number to the outgoing call, manages the physical requirements of the subscriber terminal A and transmits to the concept generating and managing unit 207 a service key indicating the existence of the outgoing call, the call number and an identifying number of the SSP 203-n in which the subscriber terminal B on the reception side is accommodated.

The concept generating and managing unit 207 generates one concept LEG (LEG1) indicating a path formed between the SSP 203-1 and SCP 201 on the basis of the service key (reception request) and the call number received from the internal primitive unit 206. Also, the concept generating and managing unit 207 manages a corresponding relation between the allocated LEG number and the call number and transmits the generated concept to the SCP 201 together with the service key (reception request).

The concept and the service key (reception request) transmitted by the concept generating and managing unit 207 within the SSP 203-1 are transmitted to the SCP 201 through the telephone signal network 202 and received by an SSP corresponding concept generating and managing unit 208 within the SCP 201. The SSP corresponding concept generating and managing unit 208 determines the service brought by the SCP 201 on the basis of the received service key (reception request) and actuates the service. When the reception request is issued from the subscriber terminal A to the subscriber terminal B, then a concept LEG (LEG2) indicating a path extending from the SCP 201 to the SSP 204 (in which the subscriber terminal B is accommodated) is generated. Then, the concept CONNECTOR, which is used to connect these two concepts LEG1 and LEG2, is generated. Further, the SSP corresponding concept generating and managing unit 208 manages associated concepts (LEG and CONNECTOR) for every SSP 203.

When the SSP corresponding concept generating and managing unit 208 generates the concept necessary for the service, the instruction generating unit 209 is actuated. The instruction generating unit 209 generates an ASSOCIATE instruction used to connect two path concepts LEG (LEG1 and LEG2) to the thus generated concept CONNECTOR so as to establish the communication path. Then, the instruction generating unit 209 transmits this instruction through the telephone signal network 202 to the SSP 203.

The ASSOCIATE instruction generated by the instruction generating unit 209 is received by the concept generating and managing unit 207 within the SSP 203 and then the concept generating and managing unit 207 updates a management table with respect to the newly generated concept and supplies the same to the internal primitive unit 206. Then, the internal primitive unit 206 converts the received ASSOCIATE instruction into an internal instruction by which the switching processing unit 204 can execute the switching processing in actual practice, and controls the switching processing unit 204 so as to execute the switching processing.

With this processing, the call between the subscriber terminal A and the subscriber terminal B is established, thereby enabling the communication.

When a meeting or conference call in which more than three subscribers communicate with one another is realized, the concept generating and managing unit 207 or the SSP corresponding concept generating and managing unit 208 generates a number of concepts "LEG" indicating the path between the SSP 203 in which the subscribers are accommodated and the SCP 201, for every subscriber participating in the conference call, and further generates a concept "CONNECTOR" which is used to connect the generated concepts LEG. Then, the instruction generating unit 209 generates an ASSOCIATE instruction to connect these concepts LEG to the CONNECTOR and transmits the same to the SSP 203. The concept generating and managing unit 207 receives this ASSOCIATE instruction, executes management processing of the concept and controls the switching processing unit 204 by the internal primitive unit 206 so that the switching processing unit 204 executes the appropriate switching processing, thus realizing the conference call.

When more than two existing conference calls are merged so as to form one conference call, the instruction generating unit 209 within the SCP 201 generates a COUPLE instruction which is used to couple two existing CONNECTOR concepts and transmits the same to the SSP 203. The internal primitive unit 206 of the SSP 203 responds to this COUPLE instruction to generate an internal instruction which is used to switch the subscriber terminal corresponding to the LEG coupled to any one of the two CONNECTORS to the bus of the LEG coupled to the other CONNECTOR, to thereby control the switching processing unit 204.

To end the communication, the subscriber terminal 205 supplies a disconnect request to the switching processing unit 204. This disconnect request is received by the internal primitive unit 206 and the internal primitive unit 206 transmits the call number of the subscriber terminal which issues the disconnect request to the concept generating and managing unit 207. The concept generating and managing unit 207 determines, on the basis of the call number, a path (LEG) which issues the disconnect request, and transmits a disconnect request service key and the concept of the path to be disconnected to the SCP 201. The SSP corresponding concept generating and managing unit 208 within the SCP 201 receives these signals actuates the disconnect service. In accordance therewith, the instruction generating unit 209 generates an instruction to separate the concept LEG of the path from the coupled CONNECTOR and transmits the same to the SSP 203. The concept generating and managing unit 207 of the SSP 203 receives this instruction and transmits the call number of the concept to be separated and the separate instruction to the internal primitive unit 206. Then, the internal primitive unit 206 replaces this instruction with an internal instruction which controls the switching processing unit 204 so that it executes the disconnect processing.

Preferred embodiments of the present invention will now be described with reference to the drawings.

Figure 3A:
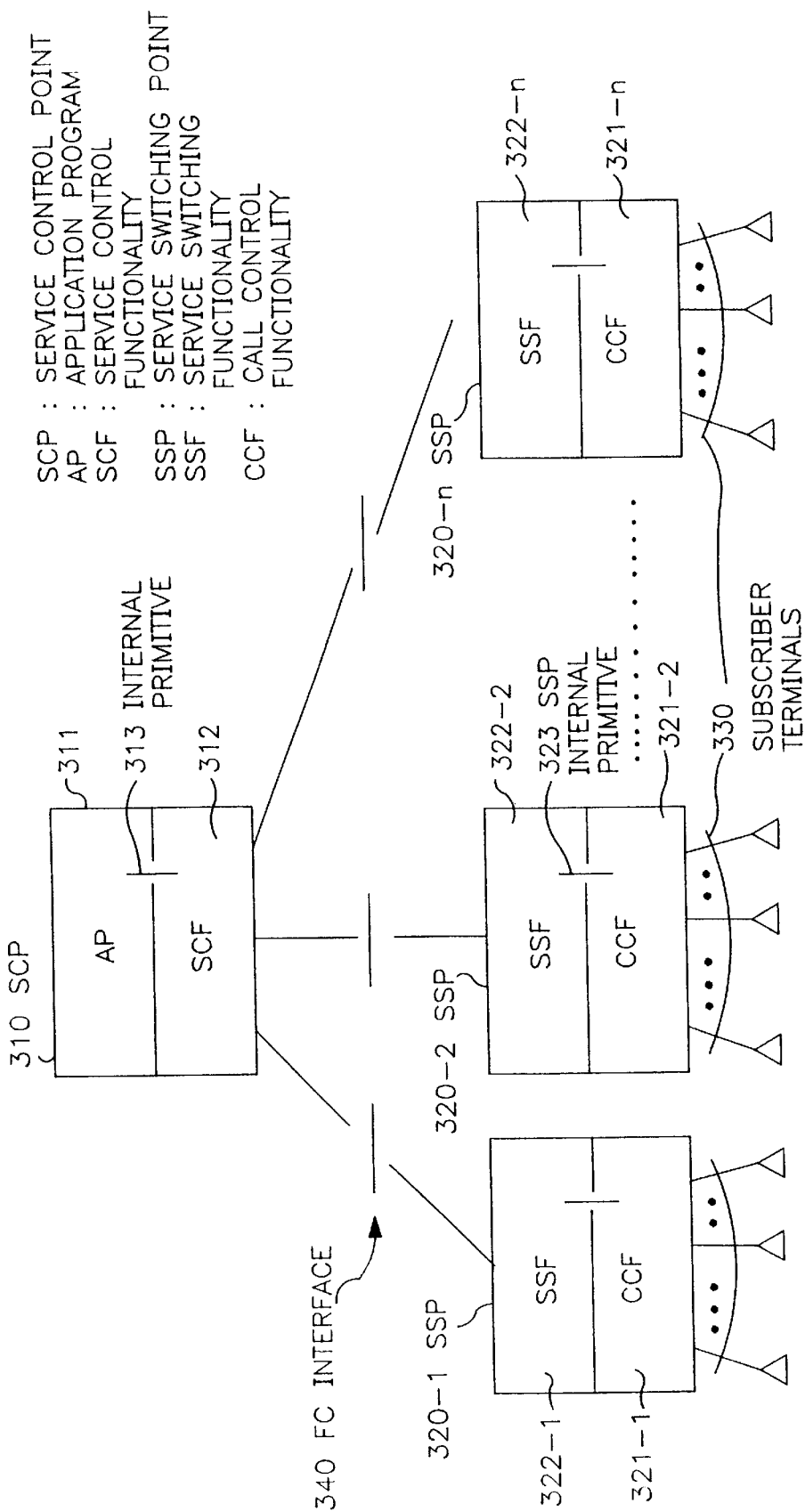
FIGS. 3A and 3B are block diagrams showing an arrangement of a system according to an embodiment of the present invention.

FIG. 3A is a schematic diagram showing a system arrangement according to an embodiment of the present invention.

Referring to FIG. 3A, in the intelligent network (IN), an SCP (service control point) 310, for bringing a variety of communication services to subscribers, exists at the center of the network. The SCP 310 comprises an aggregate of various communication service application programs (i.e. application programs) 311 and an SCF (i.e. service control functionality unit) 312 which activates programs of the AP 311 to execute the control of a variety of services. Control information is exchanged between the AP 311 and the SCF 312 by an internal primitive 313.

The SCP 310 is connected via the telephone signal network (not shown) with a plurality of SSPs (i.e. service switching points: service switching devices) 320 (320-1, 320-2, . . . , 320-n) and subscriber terminals 330 are connected to respective SSPs 320. Each SSP 320 executes the switching processing of the subscriber terminal accommodated within its own SSP 320. The SSP 320 and the SCP 310 are connected together by way of an FC interface 340 and messages independent of physical requirements, such as the location and condition of the subscriber terminal, are exchanged therebetween via the FC interface 340. The SSP 320 comprises a CCF unit 321 (i.e. a call control functionality unit) which executes call control processing in actual practice and an SSF 322 (service switching functionality unit) 322 which generates messages and which maps the physical requirements of the CCF 321. Messages are exchanged between the CCF 321 and the SSF 322 by way of an SSP internal primitive 323.

If the subscriber terminal 330 requests a service, a request message is transmitted through the CCF 321 to the SSF 322. Then, the SSF 322 manages physical requirements of the subscriber terminal 330 which requests the service and also generates a first concept LEG indicating a path through which the subscriber terminal 330 and the SCP 310 are connected. The SSF 322 transmits the first concept LEG and a service key to the SCP 310 through the FC interface 340.

Then, the SCP 310 receives the first concept LEG (indicating the above path) and the service key. The SCF 312 judges the application program to be brought to the subscriber terminal on the basis of the service key and activates the AP 311. Then, the control of service is executed in accordance with the program of the AP 311.

The SCF 312 then generates a second concept LEG indicating a path to connect an SSP 320 (having the subscriber terminal participating in the service) and the SCP 310, and further generates a concept CONNECTOR to couple the LEG concepts first and second LEG. Further, the SCF 312 generates an ASSOCIATE instruction which connects the LEG concepts first and second LEG to the CONNECTOR to enable mutual communication between the first and second LEG concepts LEG. This ASSOCIATE instruction has ID (identification) numbers of the first and second concepts LEG and CONNECTOR and connects a designated concept LEG to a designated concept CONNECTOR to thereby effect the mutual communication. The SCF 312 transmits the generated ASSOCIATE instruction to the SSP 320 through the FC interface 340.

The SSP 320 receives the transmitted ASSOCIATE instruction. Then, the SSF 322 maps physical requirements with respect to the concepts involved in the instruction and generates the SSP internal primitive 323, which allows the CCF 321 to execute call control processing. The SSP internal primitive 323 is transmitted to the CCF 321, which executes the call control processing in accordance with this internal primitive 323.

Figure 3B:
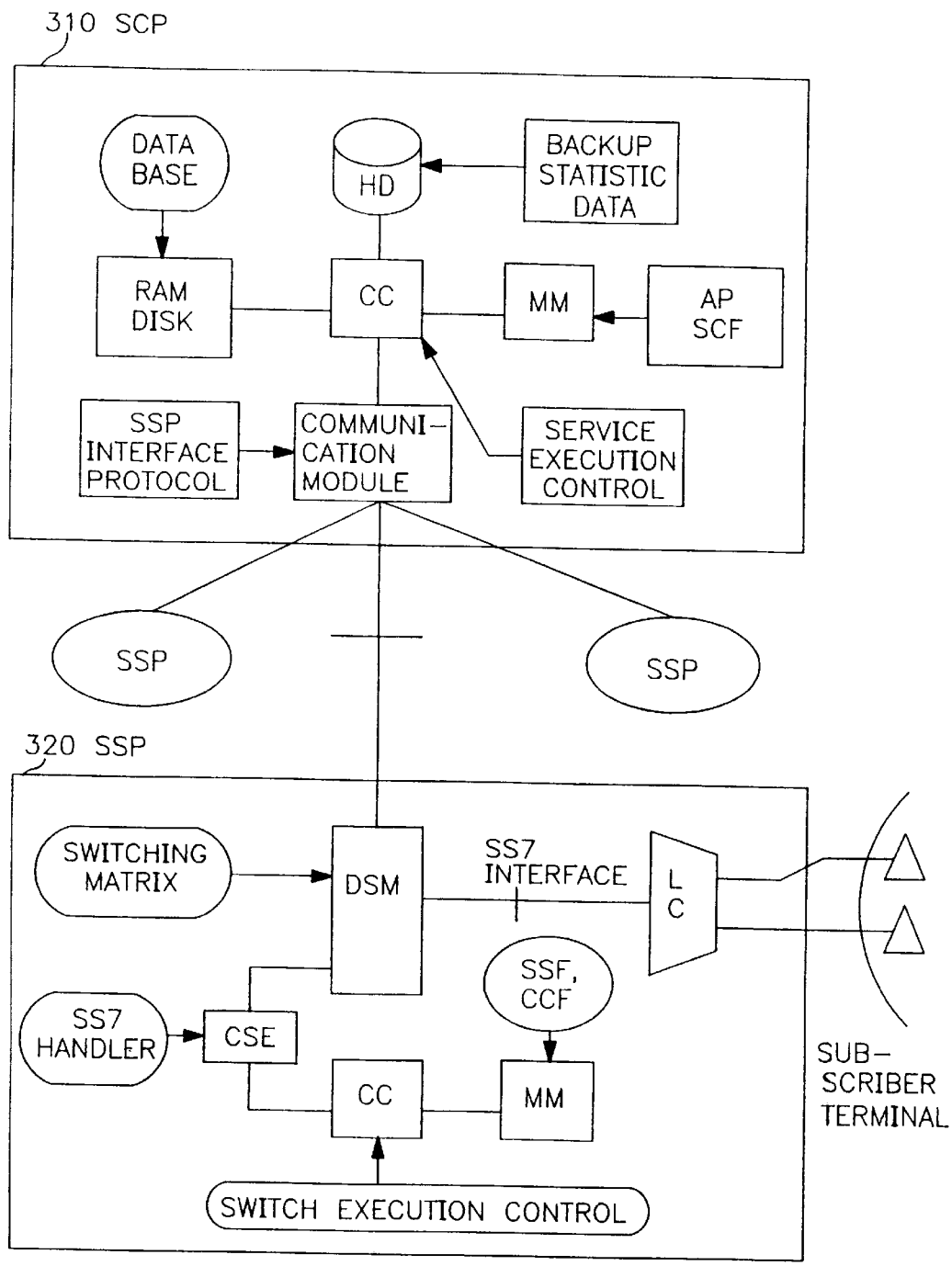

FIG. 3B shows a block diagram of SCP 310 and SSP 320. In SCP 310, the output of a data base is stored in a RAM disk. Backup statistic data is stored in a hard disk (HD). AP and SCF are stored in main memory (MM). An SSP interface protocol is provided to a communication module. A control controller (CC) is connected to the hard disk, RAM disk, main memory and communication module. A service execution control is applied to the control controller (CC). In SSP 320, a switching matrix is applied to a digital switch module (DSM). An SS7 handler is applied to a common channel signaling equipment (CSE). The CSE is provided between DSM and CC. SSF and CCF are provided to a main memory (MM). The output of the DSM is transmitted to subscriber's terminals through an SS7 interface and line concentrator (LC).

Figure 4:
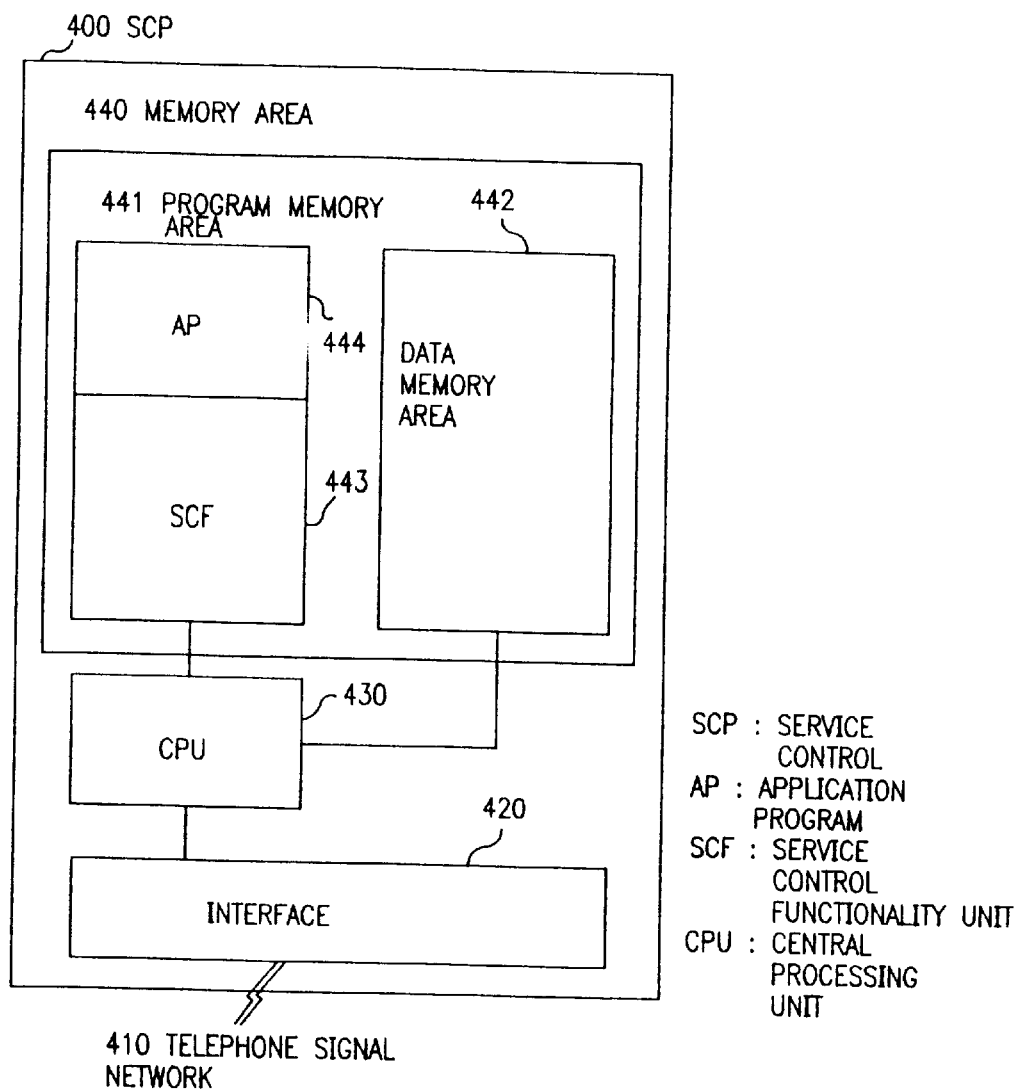
FIG. 4 is a schematic block diagram showing a system arrangement of the SCP according to the present invention.

FIG. 4 is a schematic block diagram showing an example of a system arrangement of the SCP (service control point). An SCP 400 can be realized as a computer system having an interface 420 to a telephone signal network 410. More specifically, as shown in FIG. 4, the SCP 400 is composed of the interface 420, a central processing unit 430 and a memory area 440. The memory area 440 is composed of a program memory area 441 and a data memory area 442. The program memory area 441 can be realized, for example, by a read only memory (ROM) and the data memory area 442 can be realized by a random access memory (RAM).

The program memory area 441 stores programs that are executed by the CPU 430. The programs to be stored in the program memory area 441 are the aforementioned SCF (service control functionality unit) 443 and AP (application program) 444. The SCF 443 is supplied with the message formed of the concept and the service key input from the SSP (service switching point) through the telephone signal network 410 as input data and actuates the corresponding application program AP 444 on the basis of the service key. Further, the SCF 443 manages the concept by utilizing the data memory area 442. The application programs AP 444 are, for example, fundamental service programs such as call, disconnect or the like, and service programs such as a conference service or the like.

A table for managing the concept for every SSP is prepared for the data memory area 442 and will be described more fully later.

Figure 5:
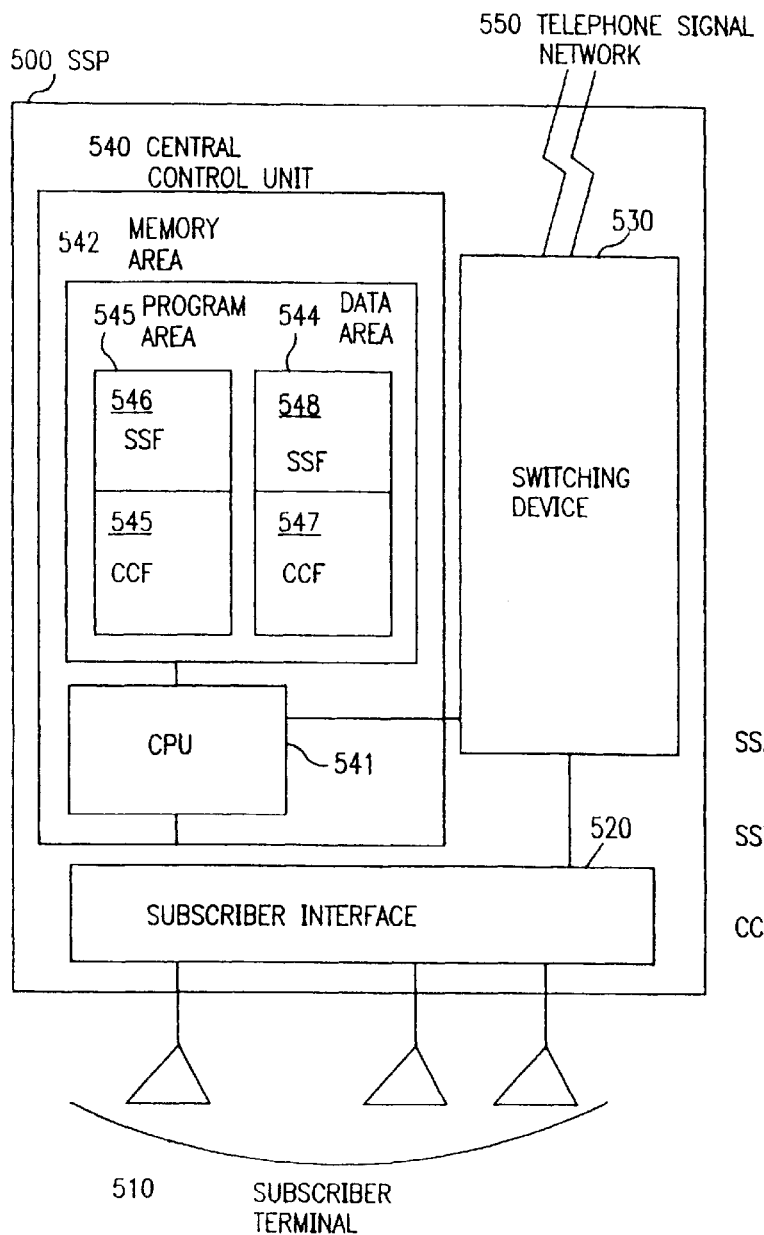
FIG. 5 is a schematic diagram showing a system arrangement of the SSP according to the present invention.

FIG. 5 is a schematic block diagram showing an example of a system arrangement of the SSP (service switching point). The SSP 500 is formed by a system arrangement similar to the standard switchboard. More specifically, as shown in FIG. 5, the SSP 500 comprises a subscriber interface 520 which accommodates therein a subscriber terminal 510, a switching device 530 which executes the switching processing, and a central control unit 540 which controls the entire intelligent network. The SSP 500 is connected through the switching device 530 to a telephone signal network 550.

The central control unit 540 is composed of a CPU 541 and a memory area 542, and the memory area 542 is composed of a program area 543 and a data area 544. The CPU 541 executes the processing in accordance with the programs stored in the program area 543. The programs are a CCF (call control functionality unit) 545 which is used to execute the conventional fundamental switching processing such as the subscriber interface 520, the switching device 530 or the like, and is also used to manage all physical requirements and an SSF (service switching functionality) 546 which is used to generate the message (formed of the concept and the service key) to be transmitted to the aforenoted SCP (service control point) and is also used to manage the concepts. The data area 544 is composed of a storage area 547 for storing physical requirements of the switching processing managed by the CCF 545 and a storage area 548 for storing the concept managed by the SSF 546.

Figure 6A:
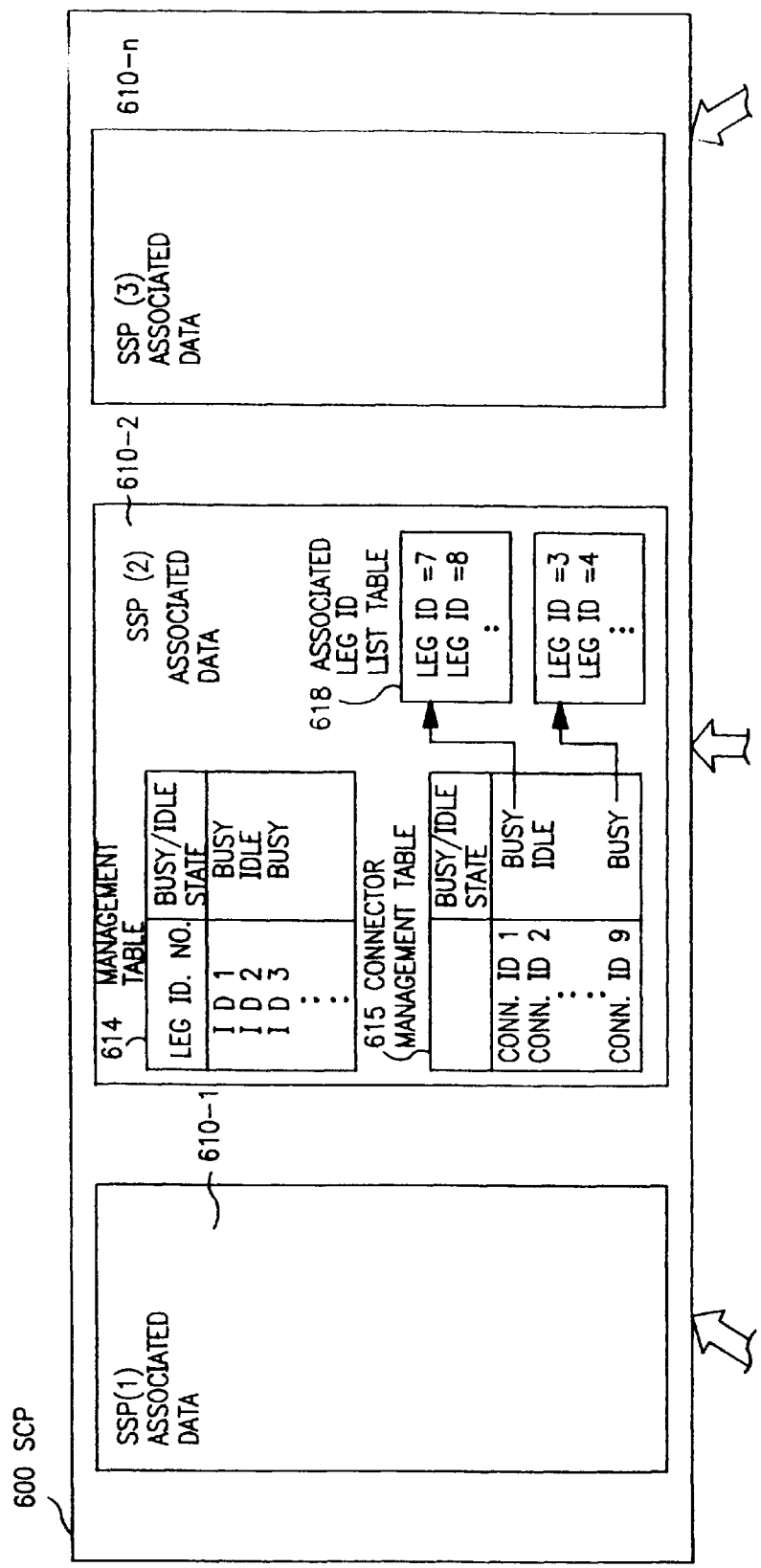
FIGS. 6A and 6B are a diagram of data format used in the embodiment of the present invention.
Figure 6B:
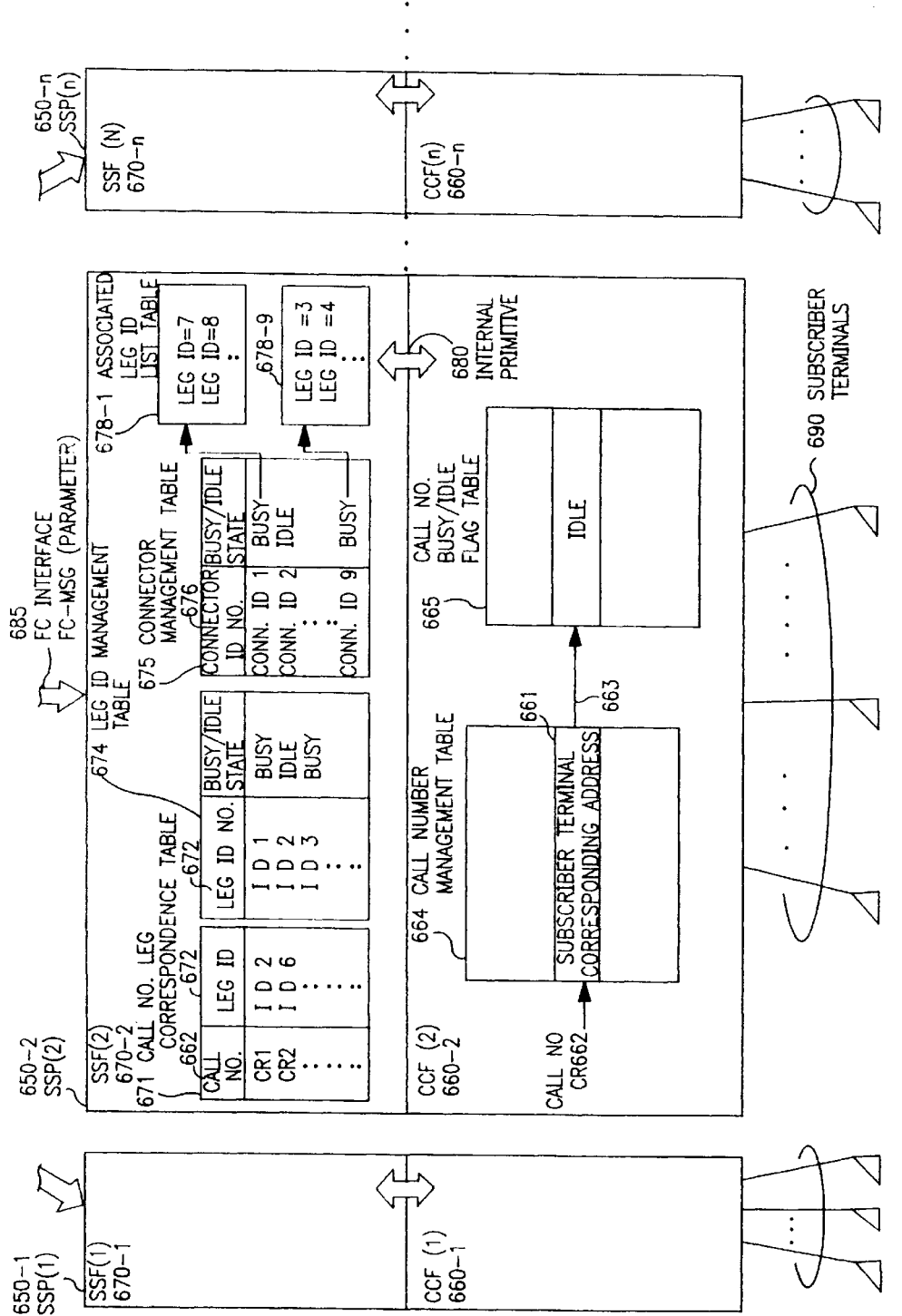

FIGS. 6A and 6B show the data format of data managed by the SSP (service switching point) and the SCP (service control point). The respective portions forming the intelligent network (IN) have tables prepared for managing concepts and physical requirements. In this case, FIG. 6 shows only the portion of the SCF associated with this embodiment with respect to the SCP.

The CCF 660 includes a call number management table 664 for managing call numbers from the subscriber terminal 690 and a call number idle and busy flag table 665 for managing the vacant or occupied condition of the subscriber terminal corresponding to the call number. The call number management table 664 is managed by a call number CR662 provided as a key and a subscriber terminal address 661 corresponding to the call number CR662 is stored in the call number management table 664. The call number idle and busy flag table 665 is managed by the subscriber terminal corresponding address 663 provided as a key, and a flag indicating whether the corresponding subscriber terminal is idle (IDLE) or busy (BUSY) is stored in the call number idle and busy flag table 665.

If the subscriber terminal A, for example, makes an outgoing call, then the CCF 660 allocates a call number CR662 to that outgoing call. An address of the subscriber terminal A is stored in the call number management table 664 at a position corresponding to the call number CR662. Further, because the outgoing call is made, the flag stored in the call number idle and busy flag table at the position of the subscriber terminal corresponding address 663 is changed from IDLE to BUSY. Then, the internal instruction corresponding to the outgoing call and the call number CR are generated as the internal primitive 680 and transmitted to the SSF 670.

The SSF 670 has a variety of tables for managing concepts. The SSF 670 has a call number-LEG correspondence table 671 for mapping the call number CR662 and the concept LEG (which is included in the internal primitive from the CCF 660) and an LEG-ID management table 674 to control the idle or busy condition of each LEG. Further, the SSF 670 has a CONNECTOR management table 675 for managing the idle or busy condition of the concept CONNECTOR (which connects the concepts LEG), and an associated LEG-ID list table 678 which is a list of concepts LEG connected to respective CONNECTORs in the busy condition.

The call number LEG corresponding table 671 manages call numbers and concepts LEG by the call number CR662 (provided as a key) and stores LEG numbers (LEG-ID numbers) 672 assigned to the respective call numbers 662. The LEG-ID management table 678 manages the idle or busy condition by the LEG-ID numbers (provided as a key) and stores the idle or busy condition of the corresponding concept LEG. The flags indicating the idle and busy conditions BUSY and IDLE, such as when the LEG ID1 is in use and when the LEG ID2 is not in use, are stored in the LEG ID management table 674.

Further, the CONNECTOR management table 675 manages the idle and busy conditions of the concept CONNECTOR by the CONNECTOR number (CONNECTOR ID number) 676 (provided as a key) and stores the flag indicating the idle or busy condition, that is, the flag BUSY if the ID1 is in use. Thus, if a certain concept CONNECTOR is in use, the corresponding associated LEG ID list table 678 is generated and all ID numbers of LEGs connected to the CONNECTOR are stored.

If the call number CR (CR1) is transmitted from the CCF 660 to the SSF 670 together with the internal primitive 680, then the SSF 670 allocates the concept LEG to the corresponding call. At that time, initially, the LEG ID management table 674 is retrieved and an LEG ID (ID2) whose idle or busy condition is IDLE is detected. Then, the detected LEG is allocated to the corresponding call. In the next process, the LEG ID number ID2 allocated in response to the call number CR1 of the call number-LEG corresponding table 671 is stored. At that time, the idle or busy condition of the ID2 on the LEG ID management table 674 is changed to BUSY. After this processing is finished, the SSF 670 transmits the service key and the concept LEG to the SCP 600 via the FC interface 685.

The SCP 600 has a table for managing the concept LEG and the concept CONNECTOR similarly to the SSF 670, but the table for managing the concepts LEG and CONNECTOR is prepared for each SSP 650 (650-1, 650-2, . . . , 650-n). The table associated with the SSP(1) 650-1 is SSP(1) associated data 610-1, and a table associated with the SSP(n)650-n is SSP(2) associated data 610-n.

Each SSP associated data 610 includes LEG ID management table 614 which manages the concept LEG, a CONNECTOR management table 615 which manages the concept CONNECTOR, and an associated LEG ID list table 618 which is a list of concepts LEG coupled to the concepts CONNECTOR. The LEG ID management table 614 stores flags indicating idle and busy conditions of the concept LEG in response to the LEG ID number. The CONNECTOR management table 615 manages the idle and busy condition flags of the concept CONNECTOR in response to the CONNECTOR ID number and also manages the address of the associated LEG ID list table 618 of the corresponding CONNECTOR if the flag is BUSY. The associated LEG ID list table 618 stores ID numbers of the concepts LEG coupled to the corresponding concept CONNECTOR.

When the service key and the concept LEG are transmitted thereto from the SSF 670 through the FC interface 685, the SCP 600 determines the service to be activated on the basis of the service key and activates the application program. In accordance with this application program, the SCF 443 generates the concept LEG with respect to the path on the incoming call side and the concept CONNECTOR to which the concept LEG is coupled, and manages the concepts generated in the table within the SSP associated data 610. Then, a message for controlling the SSP 650 is generated. This message is hereinafter referred to as an FC-MSG (functional component message).

The FC-MSG is transmitted to the SSP 650 through the FC interface 685. Then, in the SSF 670, the management of the generated concept is executed and the SSP internal primitive 680 involving the call number corresponding to the LEG and which is used to control the CCF 660 is generated and transmitted to the CCF 660 so that it executes the call control processing while taking the physical requirements of the subscriber terminal 690 into consideration.

FIG. 7 is a representation used to explain the kinds of FC-MSG (functional component message) used in the embodiment of the present invention.

As shown in FIG. 7, an instruction CREATE-LEG is adapted to generate a LEG, an instruction GENERATE-CONN is used to generate a CONNECTOR, an instruction ASSOCIATE is used to couple a LEG to CONNECTOR so as to present a two-way communication mode, an instruction JOIN is used to generate a CONNECTOR and to couple the CONNECTOR to the generated LEG, an instruction SEPARATE-LEG is used to separate a LEG from a CONNECTOR, a instruction FREE-LEG is used to free the separated LEG, an instruction REMOVE-LEG is used to separate and free a LEG one at a time, an instruction REMOVE-CONN is used to free a CONNECTOR and a LEG coupled to the CONNECTOR, an instruction COUPLE-CONN is used to couple two CONNECTORS, an instruction LEG-EXCH is used to exchange the states of two LEGs, etc. Each instruction has a parameter and can designate a LEG and or CONNECTOR and an attribute value.

Figure 8:
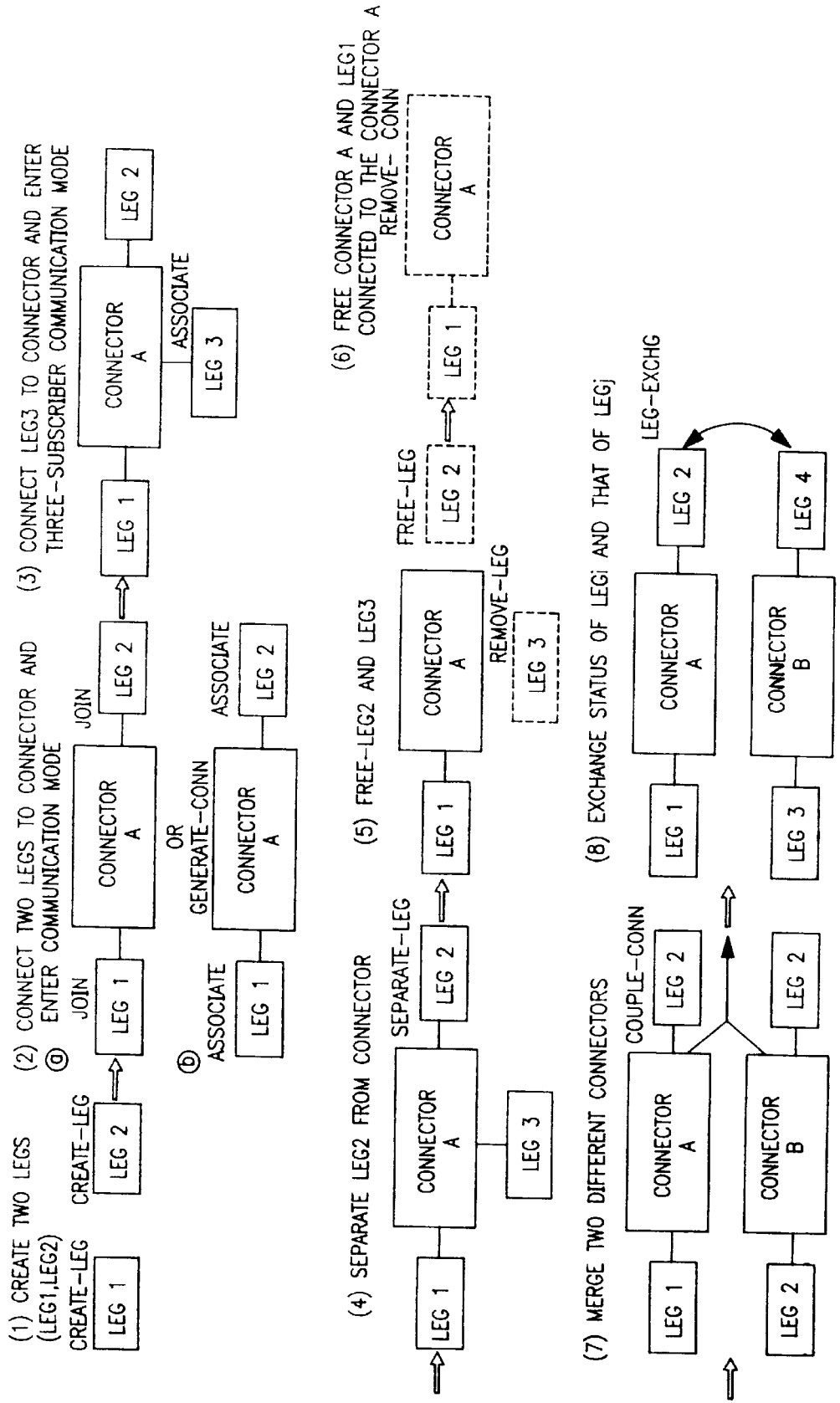
FIG. 8 is a schematic diagram used to explain how the states of concepts LEG and CONNECTOR are changed.

FIG. 8 is a diagram used to explain the conditions in which LEG and CONNECTOR are changed.

Initially, two LEGs (LEG1 and LEG2) are generated ((1) in FIG. 8) and at that time, the CREATE-LEG instruction is employed. Then, the thus generated two LEGs are coupled to CONNECTOR and a communication mode is established ((2) in FIG. 8). Two methods are considered. In the first method, CONNECTOR A is generated and then the JOIN instruction for joining LEG1 and LEG2 is used (see a in (2) of FIG. 8). In this case, CONNECTOR A and LEG1, LEG2 joined to the CONNECTOR A are added as parameters of the JOIN instruction. In the other method, CONNECTOR A is initially generated by the GENERATE-CONN instruction and then LEG1 and LEG2 are joined to the CONNECTOR A by way of an ASSOCIATE instruction (see b in (2) of FIG. 8).

Let us now describe the processing in which a third subscriber participates in the two-way communication between LEG1 and LEG2 (see (3) in FIG. 8). In this case, a LEG3 is generated in a new subscriber terminal and an ASSOCIATE instruction for joining LEG3 to CONNECTOR A is generated, thereby enabling communication among three persons.

If the communication with LEG2 is separated, a SEPARATE-LEG instruction is used to separate LEG2 from the CONNECTOR A (see (4) in FIG. 8). In this case, LEG2 is separated from CONNECTOR A but is not freed.

LEG2 and LEG3 are both freed (see (5) in FIG. 8). In this case, since LEG2 is already-separated from CONNECTOR A, LEG2 is freed by means of a FREE-LEG instruction, while LEG3 is separated or freed by means of a REMOVE-LEG instruction which executes the separation and freeing one at a time.

Next the CONNECTOR A is freed (see (6) as shown in FIG. 8). By utilizing the REMOVE-CONN instruction, the CONNECTOR A is annihilated and the LEG1 joined to the CONNECTOR A is also annihilated.

The connectors A and B are merged (see (7) as shown in FIG. 8) by utilizing the COUPLE-CONN instruction.

The legs i and j are exchanged (see (8) as shown in FIG. 8) by utilizing the LEG-EXCHG instruction.

As described above, a variety of services can be executed by using the FC-MSG.

Figure 9:
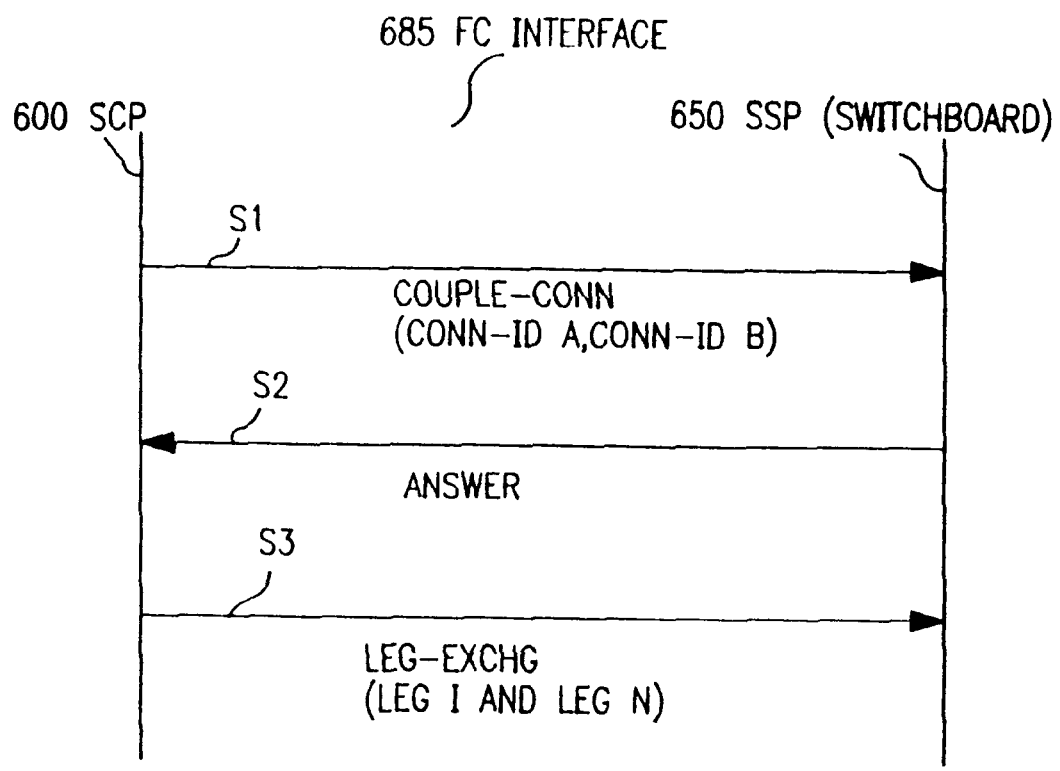
FIG. 9 is a diagram used to explain messages in the coupling of conference communications and the change of the conditions in the two concepts of LEG.

FIG. 9 is a sequence chart used to explain messages exchanged when two conference calls are merged and when two LEGs are exchanged.

Initially, two conference calls A and B are merged as one conference call to thereby present the communication state. In this case, the COUPLE-CONN instruction is supplied to the SSP 650 from the SCP 600 through the FC interface 685 (see S1). As the parameters of the COUPLE-CONN instruction, CONNECTOR IDs of two conference calls to be merged, that is, CONN-ID A and CONN-ID B, are added to the COUPLE-CONN. When receiving the above COUPLE-CONN instruction, the SSP 650 executes the processing such that a subscriber terminal of the CONN-ID B is added to the communication bus of the CONN-ID A. If this processing is ended, then a single large conference call is generated and an answer signal indicating the completion of the processing is returned from the SSP 650 to the SCP 600 (see S2).

Next described is the processing in which the states of LEG I and LEG N are exchanged. By way of example, in this processing, LEG I joined to CONNECTOR A is replaced with LEG N joined to CONNECTOR B, LEG N is joined to the CONNECTOR A and LEG I is joined to CONNECTOR B. In this case, the LEG-EXCHG instruction is transmitted from the SCP 600 to the SSP 650 and the IDs of LEG I and LEG N to be exchanged are added as the parameters.

In actual practice, according to this processing, LEG I is separated from CONNECTOR A, and LEG N is separated from CONNECTOR B (by means of a SEPARATE-LEG instruction). Also, LEG I is joined to CONNECTOR B and LEG N is joined to CONNECTOR A (by means of an ASSOCIATE instruction). However, the EXCHG instruction is prepared in order to reduce the number of message exchanges between the SCP 600 and the SSP 650. Therefore, the processing can be executed only by transmitting one instruction from the SCP 600 to the SSP 650.

When receiving this instruction, the SSP 650 breaks the instruction down into smaller instructions and generates the SSP internal primitive 680 which can control the CCF 660 in actual practice, thereby enabling the CCF 660 to execute the call control processing.

Figure 10A:
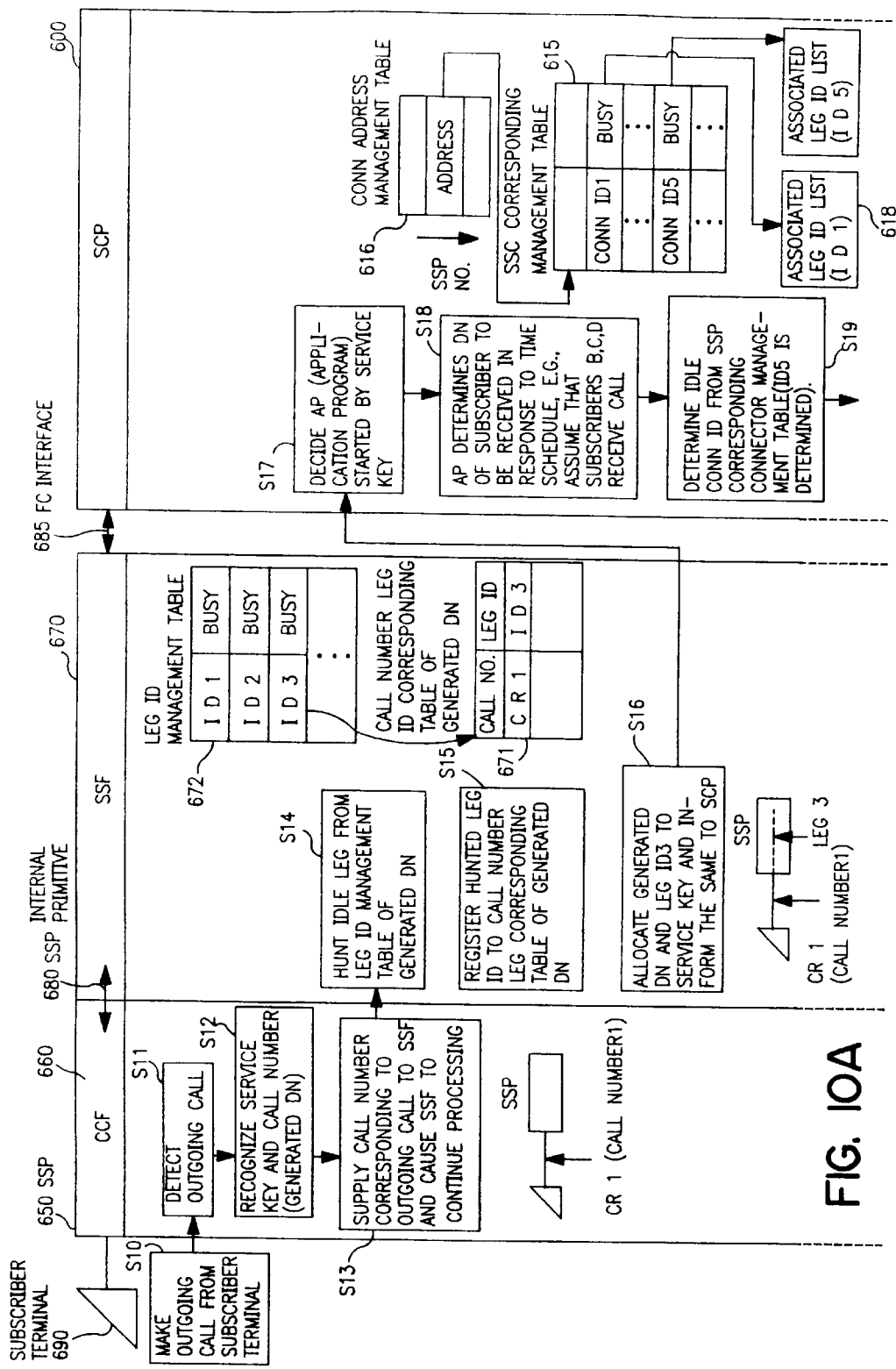
FIGS. 10A through 10C are sequence charts of a conference call and conference call coupling of the present invention.
Figure 10B:
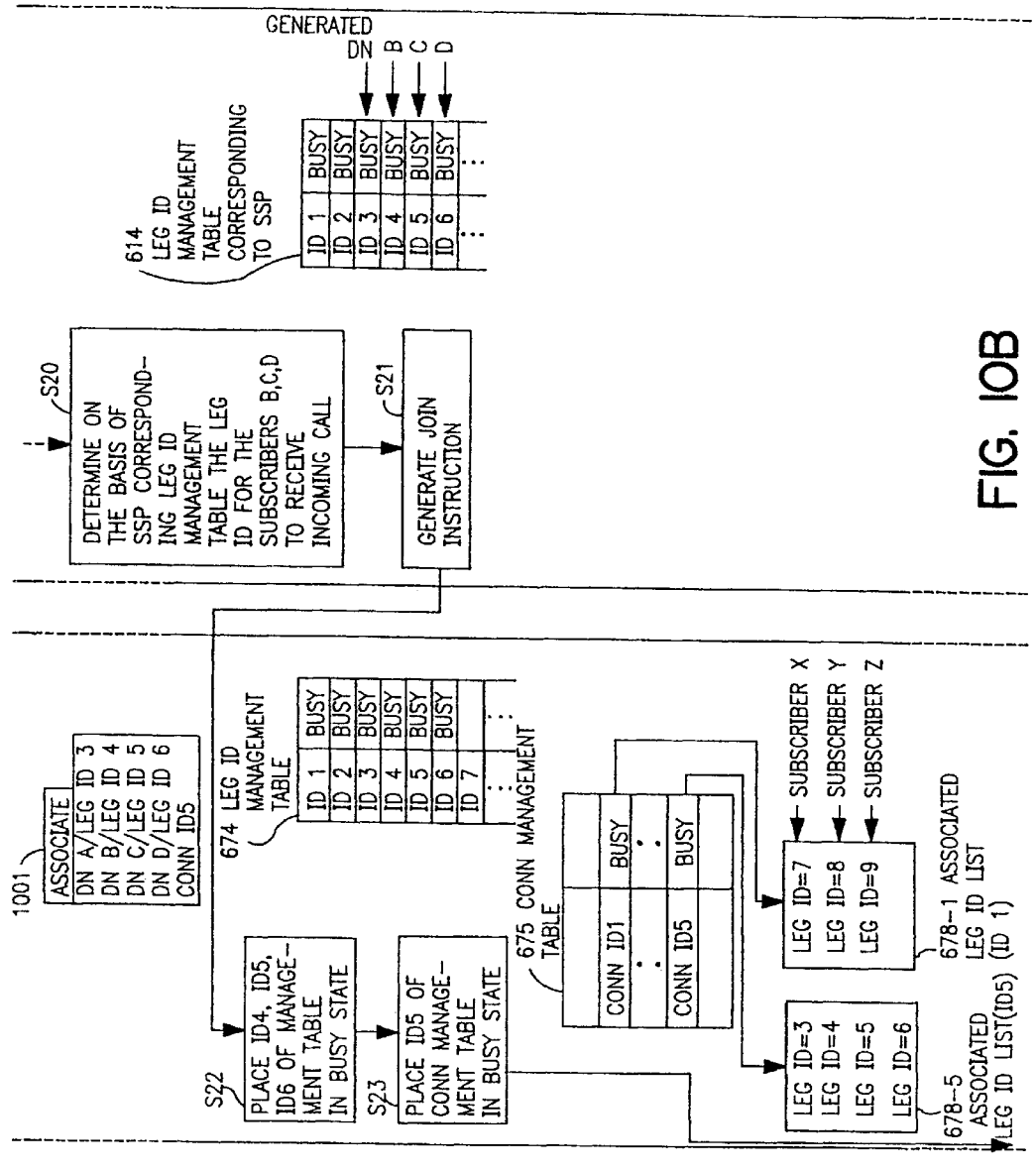
Figure 10C:
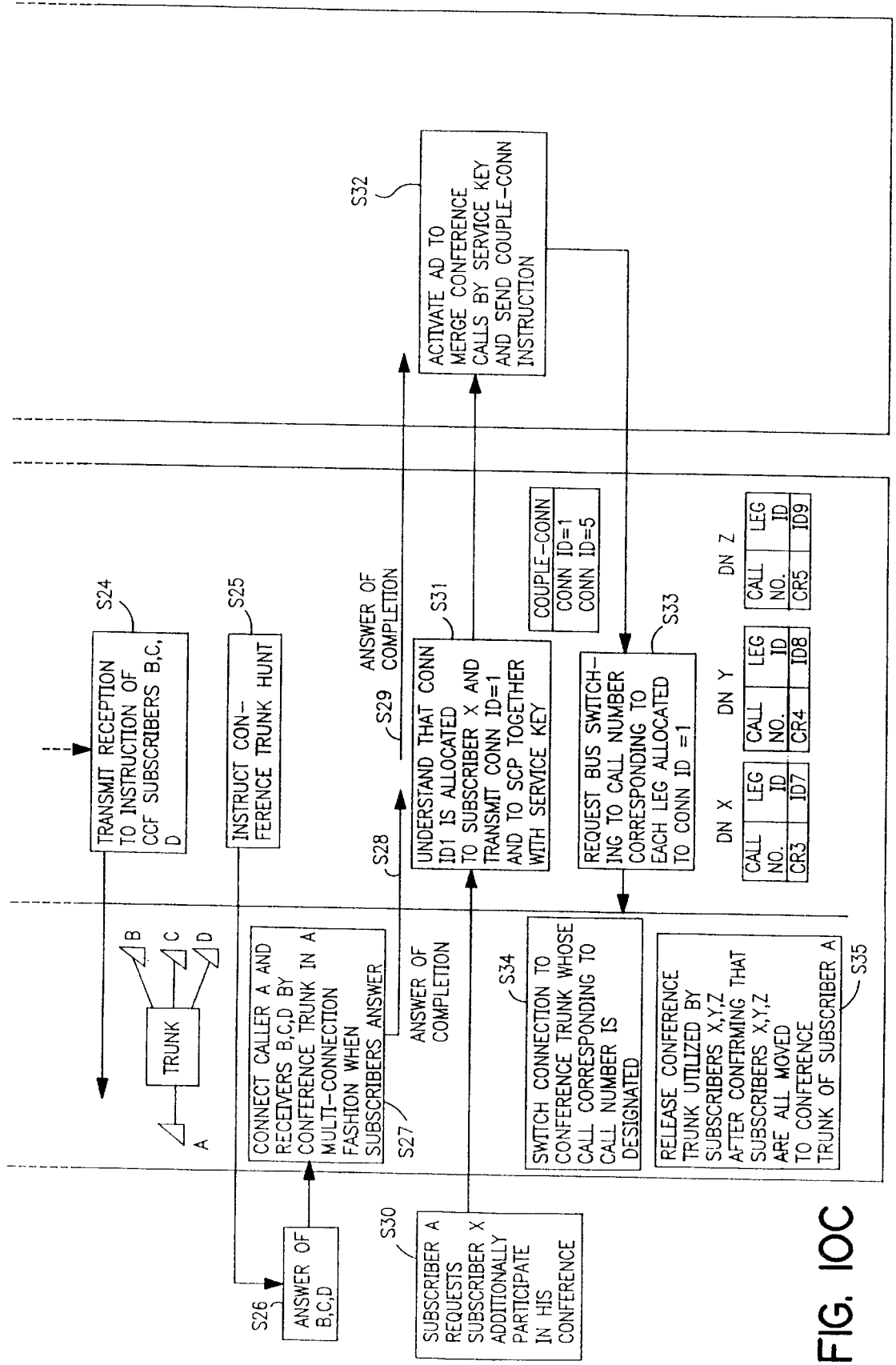

FIGS. 10A through 10C are sequence charts for explaining how the conference calls are generated and merged. In this case, the sequence between the subscriber terminal 690, the SSP 650 (CCF 660-SSF 670), the FC interface 685 and the SCP 600 is represented in FIGS. 10A through 10C. Let it now be assumed that the subscriber terminal A has a meeting with the subscriber terminals B, C, and D, and that one conference merged with the conference held by subscriber terminals X, Y, and Z is held.

If the subscriber terminal 690 makes an outgoing call (see S10), this outgoing call is detected by the CCF 660 within the SSP 650 (see S11). Then, the CCF 660 recognizes the service key and the dial number (generated DN) of the subscriber terminal which makes the outgoing call (see S12). The CCF 660 assigns the call number to this subscriber terminal which makes the outgoing call and delivers the service key and the call number to the SSF 670 (see S13). Now, assuming that call number CR1 is allocated to the outgoing call, then the CCF 650 manages the generated DN of the subscriber terminal which makes the outgoing call and the allocated call number CR1 by the call number management table 664.

When receiving the service key and the call number, the SSF 670 executes the processing in which the concept LEG is assigned to the call (see S14 to S16). More specifically, the LEG ID management table 672 within the SSF 670 is retrieved and a vacant LEG (LEG in the IDLE condition) is hunted (see S14). In this embodiment, it is assumed that the LEG in the LEG ID3 is hunted. Then, the ID (ID3) of the hunted LEG is stored in the call number LEG corresponding table 671 (see S15), whereby the LEG ID number ID3 is stored in the call number-LEG corresponding table 671 at a position corresponding to the call number CR1. Further, the SSF 670 transmits the generated DN and the thus generated LEG ID3 to the SCP 600 together with the service key (see S16).

Upon reception, the SCP 600 determines the application program to be activated on the basis of the service key (see S17). In this case, it is assumed that the SCP 600 activates the application program which generates the conference call from the service key. The application program which generates the conference call determines the DN (i.e. dial number) of the subscriber terminal which receives an incoming call corresponding to the time zone (see S18). In this case, subscriber terminals B, C and D become subscriber terminals which receive incoming calls.

Then, the SCP 600 draws the address of the CONNECTOR management table 615 from the CONN address management table 616 within the SSP associated data 610 corresponding to the SSP 650 and retrieves the CONNECTOR management table 615. Then, the SCP 600 detects the ID number of the idle CONNECTOR and allocates the same as the concept of the CONNECTOR to which the conference call is coupled (see S19). In this case, the ID5 is in the IDLE condition and the CONN ID5 is allocated.

Next, the SCP 600 allocates the concept LEG of path to the subscriber terminals B, C and D on the incoming call side (see S20). That is, the LEG ID management table 614 corresponding to the SSP 650 is retrieved and the LEG ID4 which is in the IDLE condition is retrieved. Now, the LEG ID4 is allocated to the subscriber terminal B, the LEG ID5 is allocated to the subscriber terminal C and the LEG ID6 is allocated to the subscriber terminal D. On completion of the allocation, ID4 to ID6 of the SSP corresponding LEG ID management table 614 are placed in the BUSY condition.

In the last processing, the SCP 600 generates the JOIN instruction 1001 by which LEG ID3, LEG ID4, LEG ID5 and LEG ID6 are coupled to CONNECTOR ID5 (see S21), and transmits the same to the SSF 670 through the FC interface 685. As the parameters, the outgoing call DN, the LEG ID3 corresponding to the outgoing call DN, the DN of the subscriber terminals B, C and D on the incoming call side and the LEG ID are given.

Then, the SSF 670 receives JOIN instruction 1001 and updates the LEG ID management table 674 and the CONNECTOR management table 675 within the SSF 670 (see S22 and S23). More specifically, LEG IDs4, 5, 6 in the LEG ID management table 674 are placed in the BUSY condition (see S22) and then the CONN ID5 of the CONNECTOR management table 675 is placed in the BUSY condition (see S23). Further, since LEG IDs3, 4, 5, 6 are coupled to the CONNECTOR ID5, LEG IDs3, 4, 5, 6 are stored in the associated LEG ID list table 678-5 of the CONN, ID5.

Let it now be assumed that another conference call (subscribers X, Y and Z) exists. Let it also be assumed that IDs7, 8, and 9 are LEG IDs of subscribers X, Y, and Z and that these LEG IDs7, 8, 9 are coupled to the CONNECTOR ID1, thereby forming the conference call.

Then, the SSF 670 instructs the CCF 660 to transmit an incoming call instruction to subscriber terminals B, C and D (see S24) and the CCF 660 executes this instruction. That is, the CCF 660 executes the processing for calling subscriber terminals B, C and D. Finally, the SSF 670 instructs the CCF 660 to hunt the conference trunk (see S25).

If subscriber terminals B, C and D answer the incoming call (see S26), then the CCF 660 detects the answers and couples caller A and receivers B, C, and D by utilizing the conference trunk in a multi-connection fashion (see S27). Then, the CCF 660 supplies the answer signal indicating the completion of the processing to the SSF 670 (see S28) and the SSF 670 sends this answer signal to the SCP 600 (see S29). The conference calls of subscriber terminals A, B, C and D are generated as described above.

Let us now assume a case such that, during the conference call of four persons, subscriber terminal A requests subscriber terminal X to additionally participate in its own conference (see S30). This request is transmitted through the CCF 660 to the SSF 670. The SSF 670 recognizes the fact that the CONN ID1 is already allocated to subscriber terminal X and transmits the CONN ID1 to which subscriber terminal X is coupled and the CONN ID5 of the conference call executed by subscriber terminal A to the SCP 600 together with the service key (see S31).

The SCP 600 activates the application program which couples the conference calls on the basis of the service key to make and transmit the COUPLE-CONN instruction 1002 to the SSF 670 (see S32). The SSF 670 requests the change of the communication bus relative to the call numbers corresponding to the respective LEGs (LEG IDs7, 8, 9) coupled to the CONN. ID1 (see S33). When receiving this request, the CCF 660 switches the connection of the call corresponding to the call number to the conference trunk of the subscriber terminal A (see S34). After having confirmed at S34 that subscriber terminals X, Y, and Z are all coupled to the trunk of the subscriber terminal A, the conference trunk utilized by subscriber terminals X, Y, and Z so far is opened (see S35), thereby forming the conference call in which subscriber terminals A, B, C, D, X, Y and Z participate.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A call control processing system in an intelligent network, comprising:
    a plurality of service switching devices, each including
        converting means for converting between a call number and a LEG identifier, wherein the call number identifies an outgoing call from a first subscriber accommodated in the corresponding service switching device to a second subscriber or the call number identifies an incoming call to the first subscriber accommodated in the corresponding service switching device from the second subscriber, and wherein the LEG identifier is commonly recognizable by the plurality of service switching devices,
    a first CONNECTOR management table storing a used/unused state of a plurality of corresponding first CONNECTOR identifiers, each first CONNECTOR identifier defining a group including two or more first LEG identifiers,
    a first associated LEG table storing a plurality of first LEG identifiers each corresponding to a first CONNECTOR identifier whose state is registered as being used in said first CONNECTOR management table, and
    first control means for updating said first CONNECTOR management table and said first associated LEG table according to an indication received from a service control device, and for establishing a call according to said first associated LEG table; and
the service control device including
    a second CONNECTOR management table storing a used/unused state of a plurality of corresponding second CONNECTOR identifiers,
    a second associated LEG table storing second LEG identifiers each corresponding to a corresponding second CONNECTOR identifier whose state is registered as being used in said second CONNECTOR management table, the second LEG identifiers being stored corresponding with the corresponding second CONNECTOR identifier, and
    second control means for determining a second LEG identifier and a second CONNECTOR identifier to be used according to a destination and a service of a call designated by a subscriber accommodated in the corresponding service switching device, for setting a determined result in said second CONNECTOR management table and second associated LEG table, and for transmitting an instruction to accord said first CONNECTOR management table and first associated LEG table with said second CONNECTOR management table and second associated LEG table to the service switching device.

2. The call control processing system according to claim 1, further comprising:
    instruction generating means, provided in said service control device, for generating an instruction to have an additional LEG identifier belong to a CONNECTOR identifier which has been already associated with a plurality of LEG identifiers according to a request from a subscriber, wherein
    said second control means rewrites said first and second associated LEG tables and said first and second CONNECTOR management tables according to the instruction.

3. The call control processing system according to claim 1, further comprising:
    instruction generating means, provided in said service control device, for generating an instruction to delete a LEG identifier from a CONNECTOR identifier which has been already associated with a plurality of LEG identifiers according to a request from a subscriber, wherein
    said second control means rewrites said first and second associated LEG tables and said first and second CONNECTOR management table according to the instruction.

4. The call control processing system according to claim 1, further comprising:
    instruction generating means, provided in said service control device, for generating an instruction to merge a plurality of CONNECTOR identifiers each of which has been already associated with a plurality of LEG identifiers into one CONNECTOR identifier according to a request from a subscriber, wherein
    said second control means rewrites said first and second associated LEG tables and said first and second CONNECTOR management tables according to the instruction.

5. A service switching device as one of a plurality of service switching devices provided in an intelligent network including a service control device and the plurality of service switching devices, said service switching device comprising:

converting means for converting between a call number and a LEG identifier, wherein the call number identifies an outgoing call from a first subscriber accommodated in the corresponding service switching device to a second subscriber or the call number identifies an incoming call to the first subscriber, accommodated in the corresponding service switching device from the second subscriber, and wherein the LEG identifier is commonly recognizable by the plurality of service switching devices, a first CONNECTOR management table storing a used/unused state of a plurality of corresponding first CONNECTOR identifiers, each first CONNECTOR identifier defining a group including two or more first LEG identifiers, a first associated LEG table storing a plurality of first LEG identifiers each corresponding to a first CONNECTOR identifier whose state is registered as being used in said first CONNECTOR management table, and first control means for updating said first CONNECTOR management table and said first associated LEG table according to an indication received from a service control device, and for establishing a call according to said first associated LEG table; and wherein the service control device includes a second CONNECTOR management table storing a used/unused state of a plurality of corresponding second CONNECTOR identifiers, a second associated LEG table storing second LEG identifier each corresponding to a corresponding second CONNECTOR identifier whose state is registered as being used in said second CONNECTOR management table, the second LEG identifiers being stored corresponding with the corresponding second CONNECTOR identifier, and second control means for determining a second LEG identifier and a second CONNECTOR identifier to be used according to a destination and a service of a call designated by a subscriber accommodated in the corresponding service switching device, for setting a determined result in said second CONNECTOR management table and second associated LEG table, and for transmitting an instruction to accord said first CONNECTOR management table and first associated LEG table with said second CONNECTOR management table and second associated LEG table to the service switching devices.

6. A service control device, provided in an intelligent network including a plurality of service switching devices, each of the plurality of the service switching devices comprising:

converting means for converting between a call number and a LEG identifier, wherein the call number identifies an outgoing call from a first subscriber accommodated in the corresponding service switching device to a second subscriber or the call number identifies an incoming call to the first subscriber accommodated in the corresponding service switching device from the second subscriber, and wherein the LEG identifier is commonly recognizable by the plurality of service switching devices, a first CONNECTOR management table storing a used/unused state of a plurality of corresponding first CONNECTOR identifiers, each first CONNECTOR identifier defining a group including two or more first LEG identifiers, a first associated LEG table storing a plurality of first LEG identifiers each corresponding to a first CONNECTOR identifier whose state is registered as being used in said first CONNECTOR management table, and first control means for updating said first CONNECTOR management table and said first associated LEG table according to an indication received from a service control device, and for establishing a call according to said first associated LEG table, and said service control device including a second CONNECTOR management table storing a used/unused state of plurality of corresponding second CONNECTOR identifiers, a second associated LEG table storing second LEG identifiers each corresponding to a corresponding second CONNECTOR identifier whose state is registered as being used in said second CONNECTOR management table, the second LEG identifiers being stored corresponding with the corresponding second CONNECTOR identifier, and second control means for determining a second LEG identifier and a second CONNECTOR identifier to be used according to a destination and a service of a call designated by a subscriber accommodated in the corresponding service switching device, for setting a determined result in said second CONNECTOR management table and second associated LEG table, and for transmitting an instruction to accord said first CONNECTOR management table and first associated LEG table with said second CONNECTOR management table and second associated LEG table to the service switching device.

\* \* \* \* \*